United States Patent [19]
McCrary

[11] Patent Number: 6,108,145
[45] Date of Patent: Aug. 22, 2000

[54] THERMAL LOADING RETAINER

[75] Inventor: Donald McCrary, Orlando, Fla.

[73] Assignee: Lockheed Martin Corporation, Bethesda, Md.

[21] Appl. No.: 09/316,131

[22] Filed: May 21, 1999

[51] Int. Cl.$^7$ .................................................. G02B 7/02
[52] U.S. Cl. ............................................................ 359/820
[58] Field of Search ................................... 359/820, 703, 359/704, 819

[56] References Cited

U.S. PATENT DOCUMENTS

| | | | |
|---|---|---|---|
| 2,533,478 | 12/1950 | Lee et al. ................................. | 396/529 |
| 2,537,900 | 1/1951 | Lee et al. ................................. | 359/820 |
| 4,147,413 | 4/1979 | Sims et al. ............................... | 359/820 |
| 4,850,674 | 7/1989 | Hasselskog ............................... | 354/820 |
| 5,157,554 | 10/1992 | Kashihara ................................. | 359/820 |
| 5,210,650 | 5/1993 | O'Brien et al. .......................... | 359/820 |
| 5,270,870 | 12/1993 | O'Brien et al. .......................... | 359/820 |
| 5,510,935 | 4/1996 | Whitty et al. ........................... | 359/822 |
| 5,557,474 | 9/1996 | McCrary .................................. | 359/820 |
| 5,570,238 | 10/1996 | Leary ....................................... | 359/820 |
| 5,612,826 | 3/1997 | Ohshita .................................... | 359/819 |
| 5,864,739 | 1/1999 | Kaneko et al. .......................... | 399/220 |

*Primary Examiner*—Georgia Epps
*Assistant Examiner*—Ricky Mack
*Attorney, Agent, or Firm*—Burns, Doane, Swecker & Mathis, LLP

[57] ABSTRACT

In a lens system including a thermal compensation mechanism that compensates for unwanted positional shifts between two tenses in the lens system resulting from changes in a temperature of the lens system, a bias mechanism is provided to bias elements of the lens system together. The bias force exerted by the bias mechanism on the thermal compensation mechanism insulates the lenses from effects of a dynamic environment, and ensures that a distance between the lenses along the optical axis will change with temperature of the lens system to provide necessary compensation. In an exemplary embodiment, the bias mechanism is a cylinder with a helical cut along its length that laterally surrounds a portion of the compensation mechanism, and provides a bias force in a direction parallel to the optical axis to urge angled interfaces of the compensation mechanism into abutment.

7 Claims, 3 Drawing Sheets

THERMAL LOADING RETAINER

BACKGROUND OF THE INVENTION

1. Field of the Invention

The invention relates generally to the field of lens systems, and specifically to the field of securing lenses within a lens system.

2. Background Information

Commonly assigned U.S. Pat. No. 5,557,474, which is hereby incorporated by reference, describes a passive thermal compensation mechanism that compensates for positional shifts between lenses in a lens group that occur due to thermal changes. This compensation can be useful, for example, to maintain as focal point of the lens group at a predetermined position through a temperature change. For example, the mechanism can be used within the optical path of a dual field of view missile seeker to permit both wide field of view (WFOV) and near field of view (NFOV) optical paths to remain parfocalized over a significant temperature range.

In particular, the '474 patent discloses a lens system for mounting lenses. As a temperature of the lens system changes, spacers in the lens system provide a displacement along the lens axis that compensates for radial expansion or contraction of the lenses along a radial plane. For example, where one or more of the spacers has a smaller thermal coefficient of expansion than the other ones of the spacers, the lenses will move apart as the temperature increases.

The '474 patent further discloses a biasing mechanism such as a load spring, elastic material or elastic member. The biasing mechanism ensures that the spacers in the lens system are abutting at all times and helps keep the lenses from moving or vibrating.

These principles are illustrated, for example, in FIGS. 1–3 of the present application. At room temperature, the optical system is adjusted so that both narrow field of view (NFOV) and wide field of view (WFOV) images are coincident (parfocalized). Thereafter, as temperature changes, the thermal effects on the optical materials and mechanical components would cause the NFOV and WFOV images to separate absent thermal compensation. As an example, it has been determined for a specific system in FIGS. 1, 3 and 3, that in order to adjust for defocus due to thermal changes, the air space between a first lens 1 and a second lens 2 must be varied at a rate of minus 0.007 inch per change of 30° C. along the optical axis 20. This amount of positional shift accommodates various thermal effects including changes in the index of refraction, the lens shape and the relative dimensions of the lens and of various mechanical components.

The required air space change can be precisely accomplished by (1) controlling the contact slope angle of each space or interface, (2) determining the number of interfaces, and (3) properly selecting materials having different coefficients of thermal expansion (CTE).

Between lenses 10a and 10b, as shown in FIG. 1, are a series of annular spacers, each spacer having at least one angled side surface. The first, third and fifth spacers 11, 13 and 15, as shown in FIG. 1, are made of a material having a specific CTE. The even spacers 12 and 14 are made of a material having a different CTE. If a negative spacing change (wherein the spaced apart objects get closer as temperature increases) is desired, the odd annular rings 11, 13 and 15 of FIG. 1, should have a smaller CTE value than the matching even annular rings 12 and 14 of FIG. 1.

For instance, if a negative spacing change is desired, the odd spacers 11, 13 and 15 may be manufactured from a stainless steel alloy having a CTE of $5.5 \times 10^{-6}/°$ F. The even spacers 12 and 14 may be manufactured by ultrahigh molecular weight polyethylene having a CTE of $78.0 \times 10^{-6}/°$ F. This more than tenfold difference in the CTEs leads to selective control of the relative spacing between the lenses.

As the temperature rises, all of the spacers, as well as all of the mechanical elements of the system, expand. However, the even spacers 12 and 14 expand considerably faster than the odd spacers 11, 13 and 15. Being annular rings, the even spacers 12 and 14 move outward relative to the central axis of the optical system faster than the odd spacers 11, 13 and 15. To prevent gaps forming between the spacers as a temperature of the system changes, and to ensure that the air space between the lens elements 10a and 10b changes appropriately with the temperature, the lenses and rings are biased together so that the spacers in the lens elements are abutting at all times. A biasing mechanism 16 such as a load spring or an elastic material is used.

To package the lens system, a two part mount 17 and 18 is used. The two-part mount consists of a first mount or male member 18 through which a bore is formed for holding the lenses 10a and 10b, and the even and odd spacers 11–15. A second mount or female member 17 is screwed over the first mount member 18 to maintain the biasing mechanism 16 against the first lens element 10a to ensure that the lenses 10a and 10b are not free to move or vibrate, while also maintaining the abutting relationship of the elements.

If a positive dimensional change is desired, i.e., the lenses 10a and 10b move apart with increased temperature, one need only select materials wherein the even spacers 12 and 14 have a lower coefficient of thermal expansion than the odd spacers 11, 13 and 15.

As shown in FIG. 2, the number of interfaces n and the relative angle φ there between can be utilized to control the degree of change in the spacing between the two objects or lenses 10a and 10b. Specifically, the smaller the angle φ between the radial plane 19 and the interface surface, the smaller the degree of change in the spacing. The larger the angle φ, of course, the greater the change in the spacing between the two objects 10a and 10b. However, too steep an angle φ might result in the interfaced surfaces locking together due to their relative coefficients of friction or Brinelling wherein the surface texture of one of the harder material punches into the surface of the softer material. To avoid the necessity of using too steep an angle, one might (a) properly select a greater number n of interfaces, (b) increase the contact radius R or (c) choose other materials having suitable coefficients of thermal expansion.

The interface contact angle of each of the rings may be determined by the following equation.

$$\arctan(\phi) = \frac{-(S - Ld)/n}{Td * (C1 - C2) * R}$$

where:

φ=contact angle n=number of interfaces

R=contact radius

S=required airspace change over thermal change

Ld=axial expansion of all spacers

Cx=coefficient of thermal expansion of each material, wherein "x" is a number to identify the respective materials.

Td=thermal change

With reference to FIG. 2, by solving this equation, a contact angle with 43° at each of the four interfaces will yield minus 0.007 inch axial movement between the first lens 10a and the second lens 10b for a 30° C. temperature change.

All spacer components 11–15 can be housed within a volume having a 1.2 inch outside diameter, a 1 inch inside diameter and a 0.25 inch length typical to the application shown. By selecting mixtures of contact angles ϕ, a number of interfaces n, contact radii R and materials having specific CTEs for a given thermal range, a predetermined air space change rate with respect to temperature can be achieved.

With respect to FIG. 3, the system of FIGS. 1 and 2 is positioned inside a forward looking infrared system. As illustrated, a dome 30 protects the optical system, the first lens group 31 of which includes an embodiment of the present invention, as described above. This first lens group 31 is held by a spider, or four radially spaced armatures 32 which position the first lens group 31 from a second lens group 33 which receives the light from the first lens group. As illustrated, the lens groups are focal and include two focal planes, the common focal plane 34 pf the narrow field of view (NFOV) and wide field of view (WFOV) being illustrated in FIG. 3.

The NFOV image projects through the dome 30 onto the reflective surface 35 and reflects off the back surface of the second lens 10b of the first lens group 31 to form an image on the common focal plane 34. The WFOV image refractively travels through the first lens group 31 to focus on the common focal plane 34. The light, projecting through the common focal plane 34, then projects back through the second lens group 33 to a detector, not illustrated.

However, in order to prevent over-stressing the spacers or athermal rings, to allow the thermal compensation mechanism to function smoothly and reliably, and to reduce an overall bulk of the thermal compensation mechanism, a biasing mechanism is needed that provides a relatively constant spring load and requires only a small amount of volume.

SUMMARY OF THE INVENTION

In accordance with embodiments of the present invention, a biasing mechanism is provided in a lens system having a thermal compensation mechanism for moving the lenses relative to each other based on thermal changes in the lens system. The biasing mechanism ensures that spacers in the thermal compensation mechanism are abutting at all times, and prevents vibration of the lenses in the system. The biasing mechanism provides a sufficient load to the thermal compensation mechanism so that when the lens system is subjected to a dynamic environment, such as being on board a missile in flight, optical components in the lens system move relative to each other only in response to thermal changes, and not in response to acceleration or other effects of the dynamic environment. The biasing mechanism also moderates the load it provides to the thermal compensation mechanism so that the spacers and/or athermal compensation rings that provide controlled movement in response to thermal change, are effective and not overstressed.

In accordance with an exemplary embodiment, the biasing mechanism is a cylinder with one or more helical cuts along its length that laterally surrounds a portion of the compensation mechanism, and provides a bias force in a direction parallel to the optical axis to urge the angled interfaces of the compensation mechanism into abutment. The biasing mechanism maintains a relatively constant spring load or force on the thermal compensation mechanism, fits into a small volume, and introduces few, if any, additional parts to the lens system, thus minimizing an overall bulk and complexity of the lens system as well as manufacturing costs.

BRIEF DESCRIPTION OF THE DRAWINGS

Other objects and advantages of the present invention will become apparent to those skilled in the art from the following detailed description of preferred embodiments, when read in conjunction with the accompanying drawings wherein like elements have been designated with like reference numerals and wherein.

DETAILED DESCRIPTION OF THE PREFERRED EMBODIMENTS

Figure 4:
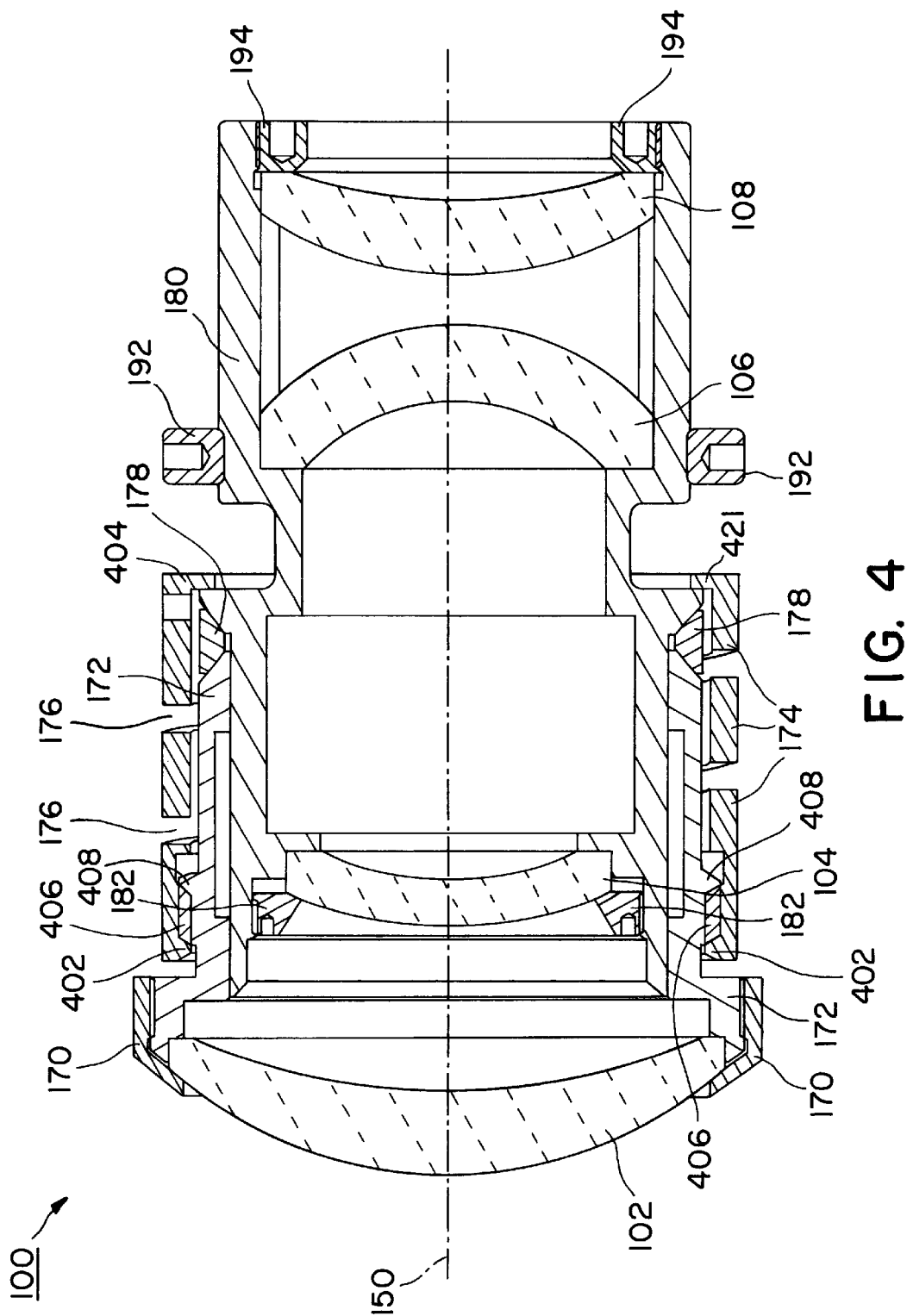
FIG. 4 shows a cross-sectional side view of a lens system incorporating an embodiment of the invention.

FIG. 4 shows a cross-sectional side view of a lens system 100 in accordance with an exemplary embodiment of the invention. The lens system includes lenses 102, 104, 106 and 108. The lens 102 moves relative to lenses 104, 106 and 108 along an optical axis 150 as a temperature of the lens system 100 changes.

As shown in FIG. 4, a mechanically passive thermal compensation mechanism compensates for unwanted lens system focus shifts. In accordance with principles described, for example, in U.S. Pat. No. 5,557,474, the compensation mechanism includes materials having differing coefficients of thermal expansion and angled interfaces that transform thermal expansion or contraction of the materials in a plane perpendicular to an optical axis 150 of the lens system, into relative movement of one of the lenses 102, 104 relative to the other of the lenses 102, 104 along the optical axis 150.

The compensation mechanism also includes a bias mechanism or athermal loading retainer 174 formed as a cylinder with one or more helical cuts 176 along its length that laterally surrounds a portion of the compensation mechanism and provides a bias force in a direction parallel to the optical axis 150 to urge the angled interfaces of the compensation mechanism into abutment.

In accordance with principles described, for example, in U.S. Pat. No. 5,557,474, a circular spacer 178 has a different coefficient of thermal expansion from a first lens mount 172 and a second lens mount 180. Because the spacer 178 is effectively located between and in abutment with the first lens mount 172 and the second lens mount 180, on which the first and second lenses 102 and 104 are respectively mounted, a change in temperature of the lens system 100 will cause the spacer 178 to move the first lens mount 172 (and the first lens 102) relative to the second lens mount 180 (and the second lens 104) along the optical axis 150.

A first lens retainer 170 holds the first lens 102 against the first lens mount 172, and a second lens retainer 182 holds the second lens 104 against the second lens mount 180.

In accordance with exemplary embodiments of the invention, the athermal loading retainer 174 provides a load or force parallel to the optical axis 150 that biases the first lens mount 172, the spacer 178 and the second lens mount 180 together. The loading retainer 174 can, for example, be configured as an elongated cylindrical member provided in the form of a helix by a spiral cut 176 along its length, as shown in FIG. 4.

The loading retainer 174 can also include projections 402 and 404 at each end that extend continuously or periodically around an inner circumference of the loading retainer 174, which engage and transfer force to the first and second lens mounts 172 and 180, respectively. As shown in FIG. 4, the projection 404 presses against a lip 408 of the second lens mount 180, to transfer force along the optical axis 150. Matching helical threads are provided on an inner surface of the projection 402 and on an outer surface portion 408 of the first lens mount 172, to engage and transfer force to the first lens mount 172 along the optical axis 150. When the matching threads are interlocking, an engagement position of the projection 402 relative to the first lens mount 172 along the optical axis 150 can be adjusted by turning the loading retainer 174 (and thus the projection 402) relative to the first lens mount 172. Since a preload bias exerted by the loading retainer on the first and second lens mounts 172 and 180 is based on the engagement position of the projection 402 on the first lens mount 172 along the optical axis 150, the preload bias can be controlled and adjusted by turning the loading retainer 174 relative to the first lens mount 172.

Other appropriate mechanisms and features can be provided on or with the loading retainer 174 instead of, or in addition to, the projections 402 and 404, to allow the loading retainer 174 to engage and transfer force to the first and second lens mounts 172 and 180.

The loading retainer 174 functions as a low-rate spring that provides a relatively constant spring load to bias the lens mounts 172 and 180 (and thereby the lens retainers 170, 182) and the spacer 178 together while permitting the spacer 178 to move the lenses 102, 104 relative to each other along the optical axis 150 without overstressing the spacer 178. The loading retainer 174 has the additional advantages of adding few, if any, additional components to the lens system 100, while providing sufficient biasing force to isolate optical components of the lens system 100 from the effects of a dynamic environment. The loading retainer 174 also fits into small volumes. Thus, incorporating the loading retainer 174 into the lens system 100 requires only a negligible, if any, increase in the size and complexity of the lens system 100.

In other words, in accordance with exemplary embodiments of the invention, a mechanically passive thermal compensation mechanism that compensates for unwanted positional shifts between at least two lenses due to changes in temperature, includes a first member having a plane and a transverse axis orthogonal to the plane. A dimension of the first member along the plane is larger than a width of the first member along the transverse axis. The first member also includes at least one angled surface forming a first angle with the plane. The first member can be, for example, one or the other of the circular spacer 178 and the first lens mount 172. The compensation mechanism also includes a second member that has at least one surface forming a second angle with the plane. The at least one surface of the second member abuts the at least one angled surface of the first member. The second member can be, for example, the other one of the circular spacer 178 and the first lens mount 172. The mechanism further includes a biasing mechanism for biasing the angled surfaces of the first and second members toward each other. The biasing mechanism can be, for example, the athermal loading retainer 174. During a temperature change, the dimension of the first member changes according to a coefficient of thermal expansion of at least the first member so that the first and second members displace relative to one another along the angled surfaces, and thereby displace relative to one another along the transverse axis based on magnitudes of the displacement along the angled surfaces and the first and second angles.

Instead of being formed as a cylinder with one or more spiral cuts, the loading retainer be configured in any other shape that is suitable for achieving the retention function described herein. For example, the loading retainer can be a helically-wound wire coil spring, or a cylindrical sheath of rubber, polymer, or other suitable elastic material, that has interior nubs or ridges at each end of the cylindrical sheath on an interior surface of the cylindrical sheath, with which the sheath can exert axial forces on the retained components to squeeze them together along the optical axis 150.

Figure 1:
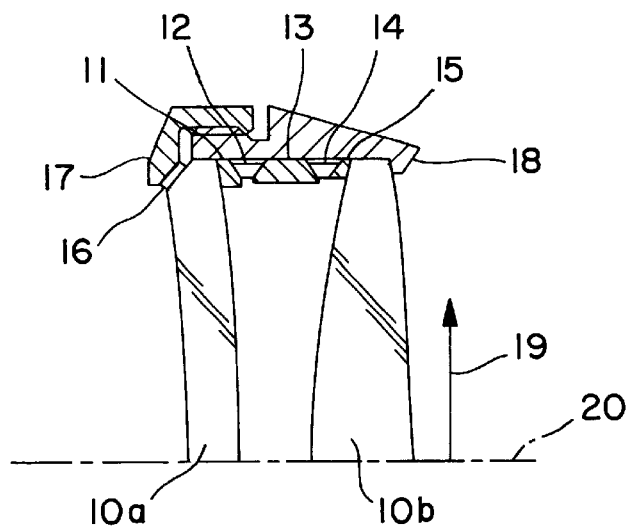
FIG. 1 shows a side view of a thermal compensation mechanism which can be adapted to incorporate an embodiment of the invention.
Figure 2:
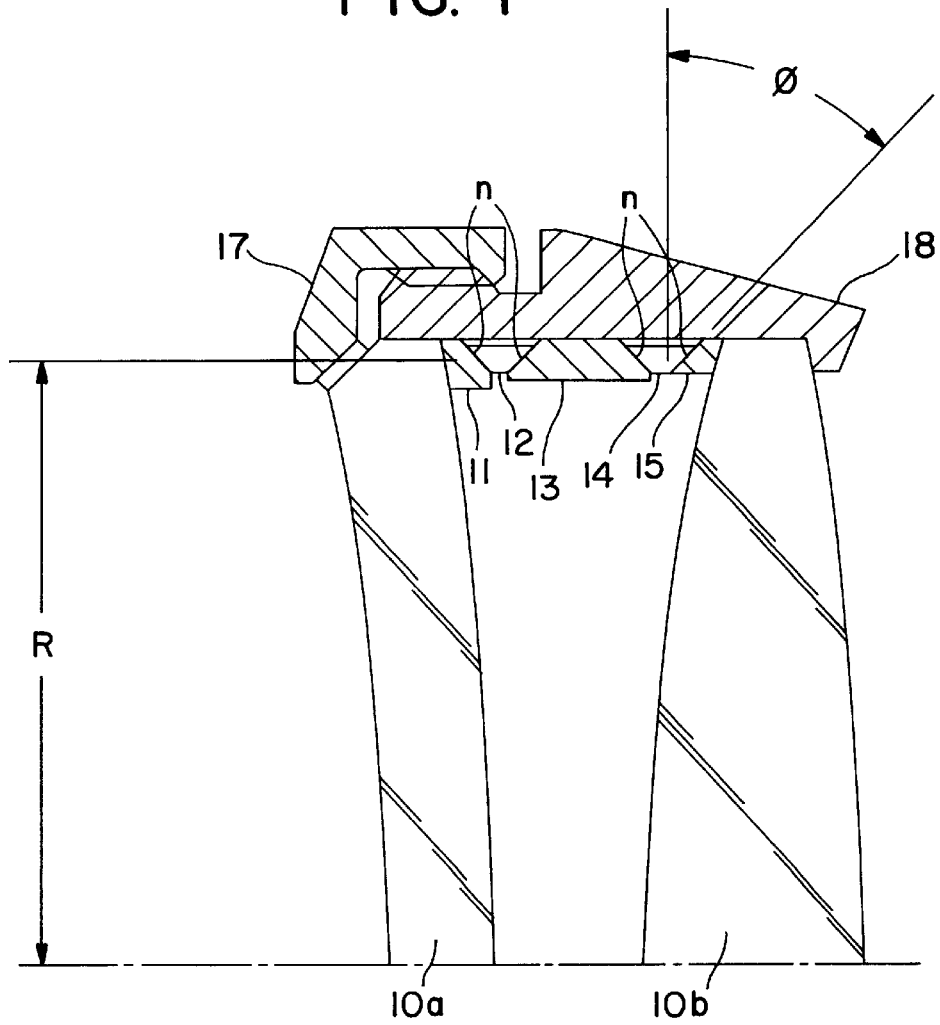
FIG. 2 shows an exploded view of the thermal compensation mechanism of FIG. 1.
Figure 3:
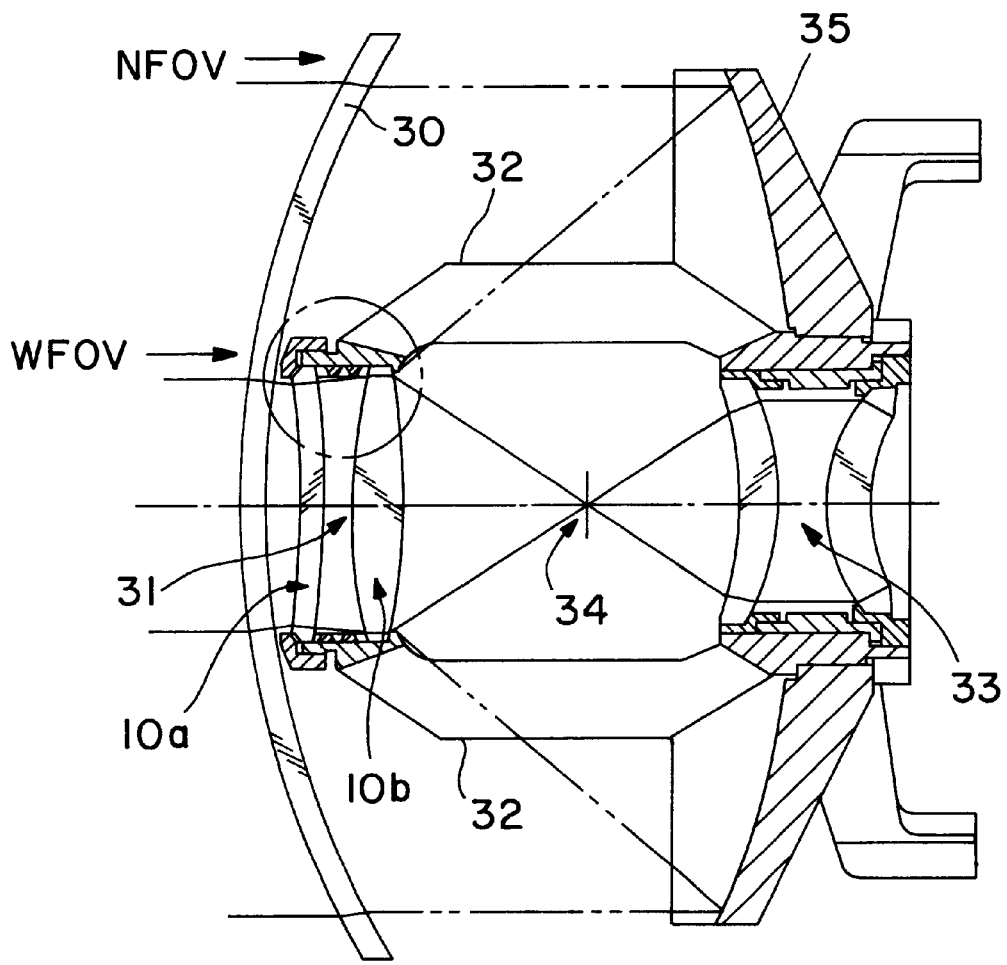
FIG. 3 shows a lens system suitable for use in a forward looking infrared system on board a missile, which includes the thermal compensation mechanism of FIG. 1 and can be adapted to incorporate an embodiment of the invention.

In accordance with embodiments of the invention, multiple spacers having different coefficients of thermal expansion, such as the spacers 11–15 shown for example in FIG. 2, can be provided between the lens retainers 170, 180 and can be biased together by the retainer 174.

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

What is claimed is:

1. A lens system comprising:
   at least two lenses;
   a mechanically passive thermal compensation mechanism for compensating for unwanted position al shifts between the at least two lenses and including materials having differing coefficients of thermal expansion and angled interfaces that transform thermal expansion or contraction of the materials in a plane perpendicular to an optical axis of the lens system, into relative movement of one of the at least two lenses relative to another of the at least two lenses along the optical axis; and
   a bias mechanism formed as a cylinder having at least one helical cut along its length and laterally surrounding a portion of the compensation mechanism, which provides a bias force in a direction parallel to the optical axis to urge the angled interfaces of the compensation mechanism into abutment.

2. The lens system of claim 1, wherein the bias mechanism includes projections at each end on an inner circumference of the bias mechanism for engaging the at least two lenses and biasing them toward each other.

3. A device comprising:
   a first member having a plane and a transverse axis orthogonal to the plane, a dimension of the first member along the plane being larger than a width of the first member along the transverse axis, the first member including at least one angled surface forming a first angle with the plane;
   a second member including an at least one surface forming a second angle with said plane of the first member, the at least one angled surface of the first member abutting the at least one angled surface of the second member; and a helical member laterally surrounding the first and second members for biasing the angled surfaces of the first and second members toward each other;

wherein during a temperature change the dimension of the first member changes according to a coefficient of thermal expansion of at least the first member so that the first and second members displace relative to one another along the angled surfaces and thereby displace relative to one another along the transverse axis based on magnitudes of the displacement along the angled surfaces and the first and second angles.

4. The device of claim 3, wherein a first end of the helical member contacts the first member and a second end of the helical member contacts the second member, and a spring force of the helical member that urges the first member toward the second member biases the angled surfaces of the first and second members toward each other.

5. The device of claim 3, wherein the helical member contacts the first and second members via projections provided at the first and second ends of the helical member along an inner circumference of the helical member, that engage the first and second members.

6. The device of claim 5, wherein at least one of the first and second ends of the helical member is provided with helical threads that match and engage helical threads provided on a corresponding at least one of the first and second members.

7. A method of designing a thermal compensation device, comprising the steps of:

determining a desired amount of change in spacing between two objects during a thermal change;

selecting materials, contact radii, angles of contact, and number of interfaces of at least two abutting, coaxial annular rings according to the equation $$\arctan(\phi) = \frac{Ld - S}{Td * (C1 - C2) * R * n}$$

where:

$\phi$=contact angle n=number of interfaces

R=contact radius

S=required airspace change over thermal change

Ld=axial expansion of all spacers

Cx=coefficient of thermal expansion of each material, wherein "x" is a number to define the respective materials Td=thermal change wherein coefficients of thermal expansion of at least two of the rings are different from each other; and providing a bias mechanism around outer circumferences of the at least two abutting, coaxial annular rings, using a cylinder with a helical cut along its length that provides a bias force in a direction parallel to the optical axis to urge the interfaces of the rings into contact with each other.

* * * * *

UNITED STATES PATENT AND TRADEMARK OFFICE
CERTIFICATE OF CORRECTION

PATENT NO. : 6,108,145
DATED : August 22, 2000
INVENTOR(S) : Donald McCrary

It is certified that error appears in the above-identified patent and that said Letters Patent is hereby corrected as shown below:

In Claim 1, line 4, change "position al" to - -positional- -.

Signed and Sealed this

Twenty-fourth Day of April, 2001

Attest:

NICHOLAS P. GODICI

Attesting Officer     Acting Director of the United States Patent and Trademark Office